United States Patent [19]
Kuo

[11] Patent Number: 5,892,600
[45] Date of Patent: Apr. 6, 1999

[54] SPECTACLE LENS STRUCTURE WITH A PLANAR REFLECTIVE OUTER SURFACE

[76] Inventor: Wei-Wu Alex Kuo, 17915 Sky Park Cir. #G, Irvine, Calif. 92714

[21] Appl. No.: 773,866

[22] Filed: Dec. 27, 1996

[51] Int. Cl.$^6$ ....................................................... G02B 5/32
[52] U.S. Cl. .............................. 359/15; 359/32; 351/51; 351/44
[58] Field of Search ............................. 359/1, 3, 15, 32; 351/51, 158, 44

[56] References Cited

U.S. PATENT DOCUMENTS

| | | | |
|---|---|---|---|
| 3,623,798 | 11/1971 | Sheridon | 359/8 |
| 4,315,665 | 2/1982 | Haines | 359/3 |
| 5,513,019 | 4/1996 | Cueli | 359/2 |

*Primary Examiner*—Cassandra Spyrou
*Assistant Examiner*—Jared Treas
*Attorney, Agent, or Firm*—W. Wayne Liauh

[57] ABSTRACT

A spectacle lens structure includes a light transmitting base plate having a serrated surface defining a hologram. A thin reflective coating having a planar outer surface is provided on the serrated surface to partially reflect an incident light and allow the remaining portion of the incident light to penetrate and diffract about the serration for the formation of the holographic image. The reflective coating may be of a refractive index quite different from that of the base plate so as to provide a brazed 3-D image. If the reflective coating is made of a material having a refractive index close to the base plate, then a further coating having a high refractive index, such as ZnS, has to be provided on the reflective coating to provide a brazed 3-D image.

11 Claims, 2 Drawing Sheets

SPECTACLE LENS STRUCTURE WITH A PLANAR REFLECTIVE OUTER SURFACE

FIELD OF THE INVENTION

The present invention relates to spectacles and in particular to a spectacle lens incorporating hologram thereon for the formation of a 3-D image to be observed by persons other than the wearer of the spectacles.

BACKGROUND OF THE INVENTION

Spectacles of different uses are known, among which sunglasses are used to protect the wearer's eyes from being damaged by intense sun light in outdoors activity or other intense light. Conventionally, some of the lenses of the sunglasses are made of PMMA (polymethyl methacrylate) acrylic material. An anti-ultraviolet agent may be mixed within the PMMA acrylic material, The PMMA acrylic material is molded, for example injection molding, to form a "primary lens" to be further processed. The "primary lens" may then be strengthened by for example soaking in chemicals and high temperature treatment, to enhance for example surface hardness. Finally, a thin layer of for example Cr is coated in a vacuum environment on the strengthened lens to (1) reflect a portion of the incident light and (2) provide the lens with different colors.

The conventional sunglass lens, however, provides very limited variation in the decorative surface aesthetics. Thus, sunglass lens having hologram structure formed thereon was developed, such as U.S. Pat. No. 4,315,665 which discloses a composite optical structure comprising a substrate having surface variation defining a hologram on which a thin layer of uniform thickness made of a partially light reflecting material having a uniform thickness is coated and an overcoat provided on the partially light reflecting material. The structure disclosed in the U.S. patent requires a sandwich structure wherein a partially light reflecting layer, such as an aluminum layer, is sandwiched between two outside layers. This increases the manufacturing cost for it has to provide a uniform thickness of the partially light reflecting layer.

Also, if a dielectric material, such as SiO, having a diffractive index very close to the substrate material, such as PMMA, is coated on the surface variation of the substrate, then the 3-D image formed by the hologram may not be bright enough to be observed by other persons.

It is therefore desired to provide a spectacle lens structure which is capable to provide a 3-D holographic image without the above-mentioned problems encountered in the prior art.

OBJECTS OF THE INVENTION

Therefore, the principal object of the present invention is to provide a spectacle lens structure which has a brazed hologram formed on a surface to provide a decorative purpose.

Another object of the present invention is to provide a spectacle lens structure which comprises a base plate made of for example PMMA acrylic material having a serrated surface defining a hologram with a reflective coating thereon, the reflective coating, such as Chromium, having a diffractive index quite different from that of the base plate so as to provide a brazed holographic image, the reflective coating providing a substantially plain outer surface for the lens.

A further object of the present invention is to provide a spectacle lens structure which comprises a base plate made of for example PMMA acrylic material having a serrated surface defining a hologram with a first coating thereon, the first coating, such as a dielectric material, for example SiO, having a diffractive index close to that of the PMMA base plate with a second coating, such as ZnS, having a high diffractive index provided thereon to provide a brazed holographic image.

To achieve the above and other objects, there is provided a spectacle lens structure comprising a light transmitting base plate having a serrated surface defining a hologram. A thin reflective coating is provided on the serrated surface to partially reflect an incident light and allow the remaining portion of the incident light to penetrate and diffract about the serration for the formation of the holographic image. The reflective coating may be of a refractive index quite different from that of the base plate so as to provide a brazed 3-D image. If the reflective coating is made of a material having a refractive index close to the base plate, then a further coating having a high refractive index, such as ZnS, has to be provided on the reflective coating to provide a brazed 3-D image.

The present invention will be better understood from the following description of preferred embodiments thereof with reference to the attached drawings, wherein:

DETAILED DESCRIPTION OF THE PREFERRED EMBODIMENT

Figure 1:
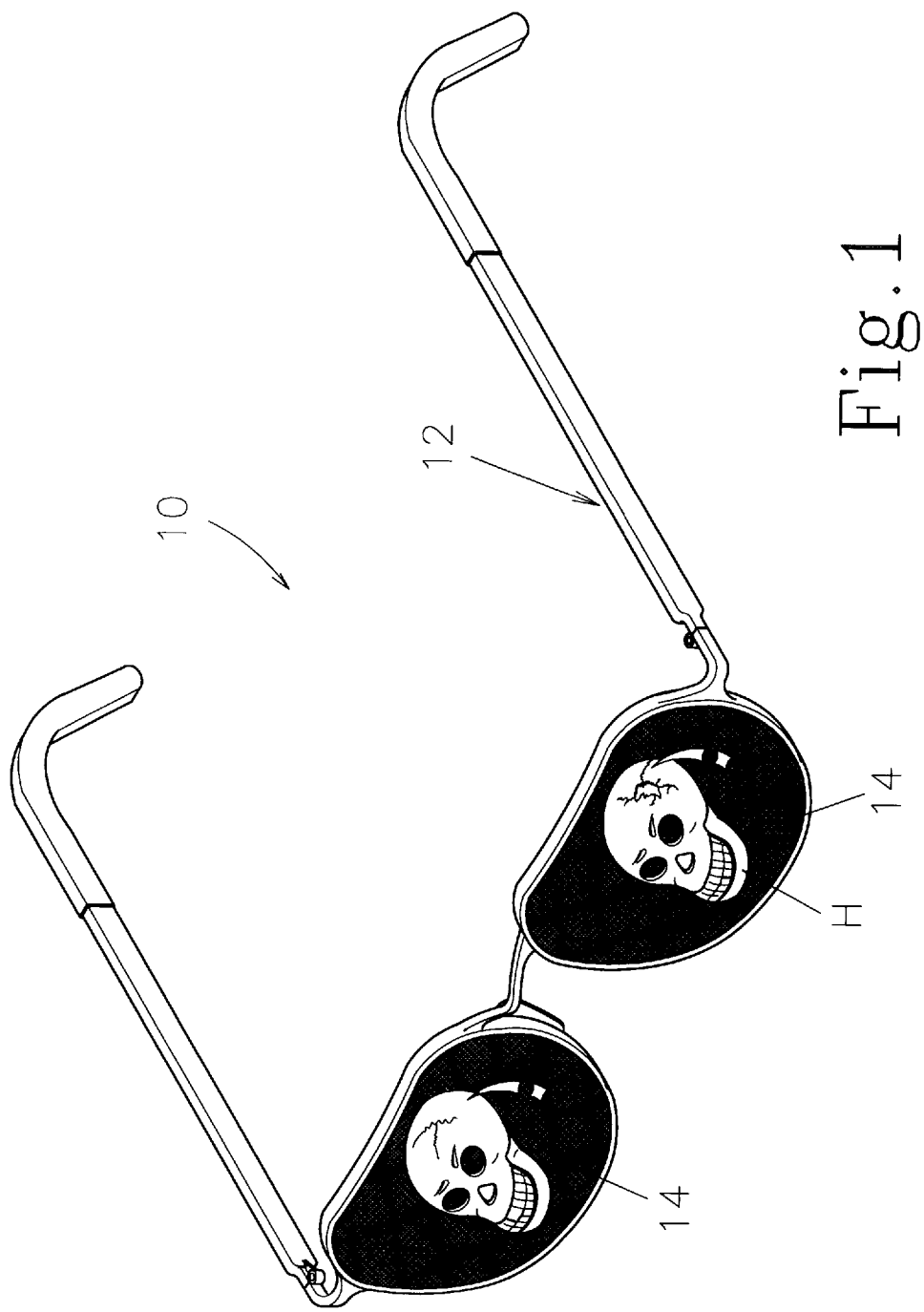
FIG. 1 is a perspective view showing a pair of spectacles with lenses constructed in accordance with the present invention, hologram images being shown on the lenses.

With reference to the drawings and in particular to FIG. 1, wherein a pair of spectacles, generally designated with reference numeral 10 is shown, the spectacles 10 comprise a frame 12 to which two lenses constructed in accordance with the present invention, generally designated at 14, are mounted. Since the structure of the spectacle frame 12 is known and constitutes no part of the present invention, no detail will be further given.

Figure 2:
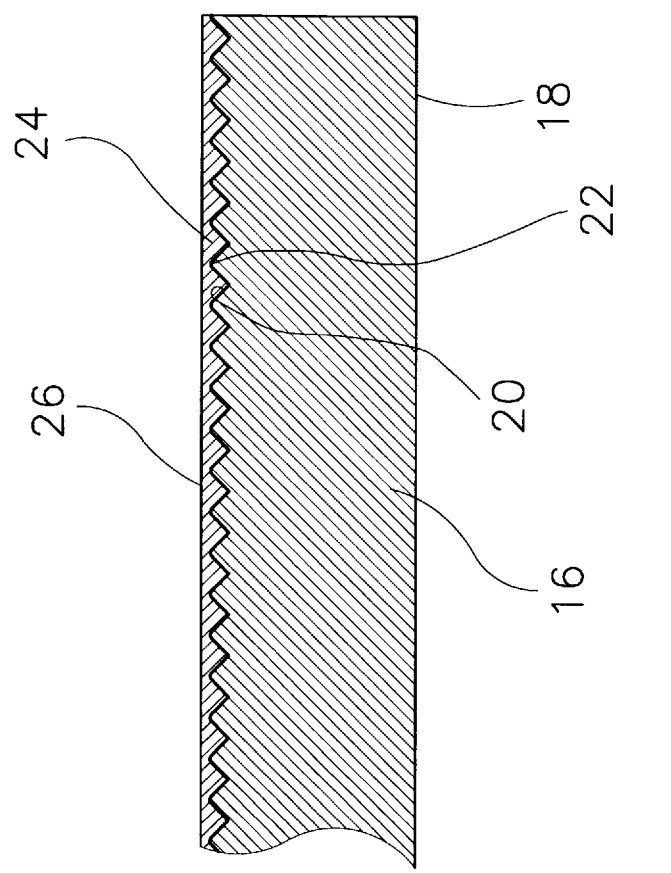
FIG. 2 is a partial cross-sectional view of the lens of the present invention.

In FIG. 2, a cross-sectional view of a portion of the spectacle lens 14 constructed in accordance with the present invention is shown. The lens 14 comprises a base plate 16 which may be any regular spectacle or sunglass lens and may be manufactured with PMMA acrylic material with an additive of anti-ultraviolet agent mixed therein. Injection molding is one of the ways to manufacture the base plate 16. The base plate 16 has an inner face 18 which is substantially plain, confronting the viewer (not shown) and an opposite outer face 20 on which serration 22 defining a hologram is molded. The holographic image is shown in FIG. 1 indicated at H.

The formation of the serration to define a holographic image is a known technique, such as U.S. Pat. Nos. 3,680, 945, 5,013,494, 5,071,596 and 5,189,531. Thus, no further detail of the formation of the hologramed surface of the lens 14 will be given herein.

Since a simple serrated surface defining a holographic image in the application of spectacles may not provide a holographic image bright and brazing enough to be observed by other persons, in accordance with the present invention, a reflective coating, preferably a metal layer 24, such as Chromium (Cr), which has a refractive index quite different from that of the base plate 16 is coated on the outer face 20 of the base plate 16 to fill in and cover the serration 22 that defines the hologram so as to form a planar outermost face 26. The Cr coating 24 provides the lens 14 with a bright and brazed 3-D image, such as that indicated at H shown in FIG. 1.

In accordance with the present invention, the metal coating 24 is so thin as to allow a portion of an incident light to penetrate therethrough and reach the wearer's eyes. The remaining portion of the incident light is reflected by the metal coating 24 to for example protect the wearer's eyes. The serration 22 that defines the hologram allows the incident light to diffract about the serrated surface and thus forming the holographic image H.

In addition, the serration 22 is comprised of a plurality of "gratings" (not explicitly shown in the drawings) with a very tiny spacing, for example 2–3 microns, between two adjacent gratings to define the hologram. Without the metal coating 24, debris or other contaminant may be deposited in the gratings and thus deteriorate the formation of the 3-D holographic image H. The coating 24 thus also serves as a protective layer of the fine gratings of the hologram.

Further, in accordance with the present invention, the serration 22 may have a substantially triangular cross section which defines a prism for decomposing the incident light so as to present a colorful pattern on the outermost face 26 of the lens 14. This is a more attractive decoration for the spectacle 10.

In another aspect of the present invention, it is also possible to use a material that has a diffractive index close to that of the base plate 16, namely PMMA acrylic material in the illustrated embodiment, to replace the metal (Cr) coating on the serrated surface 20 of the base plate 16. Such a material may comprise a dielectric material, such as SiO. However, in accordance with the present invention, to provide a bright and brazed holographic image, the coating of for example SiO has to be very thin and a layer of ZnS which has a high diffractive index has to be further coated on the SiO layer. The ZnS coating significantly enhances the brightness of the holographic image H formed by the serration 22.

Thus, in accordance with the present invention, it is possible to use either a material of a diffractive index quite different from that of the base plate or a material of a diffractive index close to that of the base plate to form the reflective coating 24. It, however, needs a high diffractive index material, such as ZnS, to be coated on the surface coating that has a diffractive index close to that of the base plate.

Although preferred embodiments of the present invention have been described to illustrate the present invention, it is apparent that changes and modifications in the preferred embodiments can be carried out without departing from the scope of the invention which is intended to be limited only by the appended claims.

What is claimed is:

1. A spectacle lens structure comprises a light transmitting base plate having a substantially planar inner face confronting a wearer and an opposite outer face on which a plurality of serrations are formed to define a hologram with a reflective coating provided thereon, the reflective coating defining a planar outer face, the reflective coating being so thin as to allow a portion of light to transmit and reflect the remaining portion of the light so as to form a holographic image.

2. The spectacle lens structure as claimed in claim 1, wherein the serrations have a triangular cross section.

3. The spectacle lens structure as claimed in claim 1, wherein the base plate has a first refractive index and the reflective coating has a second refractive index, the second refractive index being substantially different from the first refractive index.

4. The spectacle lens structure as claimed in claim 3, wherein the base plate comprises PMMA acrylic material and the reflective coating comprises chromium.

5. The spectacle lens structure as claimed in claim 1, wherein the base plate has a first refractive index and the reflective coating has a second refractive index, the second refractive index being substantially the same as the first refractive index.

6. The spectacle lens structure as claimed in claim 5, wherein the base plate comprises PMMA acrylic material and the reflective coating comprises a dielectric material.

7. The spectacle lens structure as claimed in claim 6, wherein the dielectric material comprises SiO.

8. The spectacle lens structure as claimed in claim 5, wherein a further coating having a high refractive index coated on the outer face of the reflective coating.

9. The spectacle lens structure as claimed in claim 8, wherein the base plate comprises PMMA acrylic material, the reflective coating comprises SiO, and the further coating comprises ZnS.

10. The spectacle lens structure as claimed in claim 1, wherein the serrations have a substantially right-triangular cross section.

11. The spectacle lens structure as claimed in claim 10, wherein the serrations have a substantially right-triangular cross section and are of substantially the same dimension.

* * * * *